T. R. MACMECHEN & W. V. KAMP.
AIRSHIP.
APPLICATION FILED JUNE 22, 1916.
1,219,123.  Patented Mar. 13, 1917.
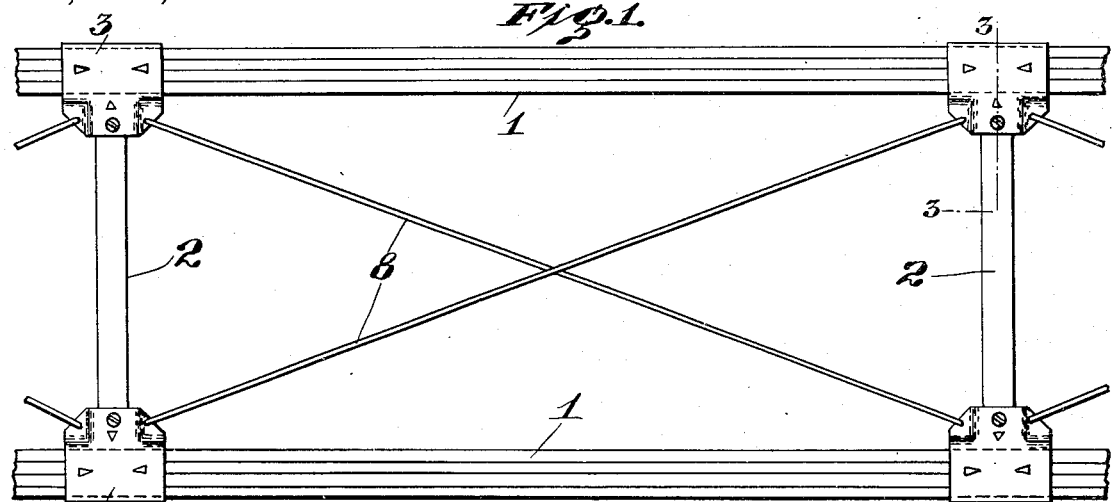
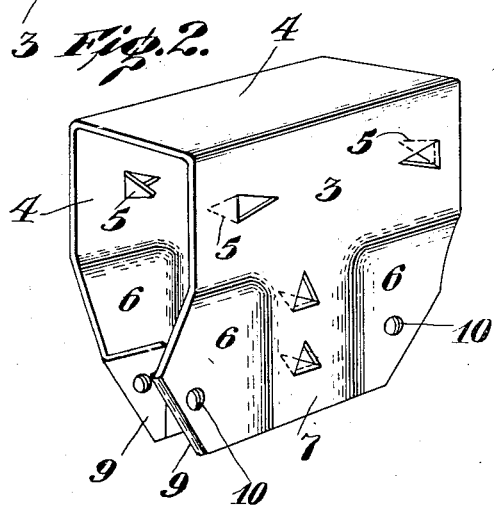
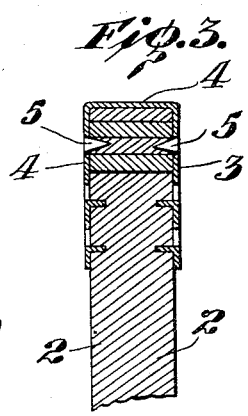
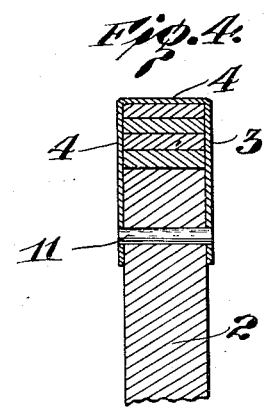
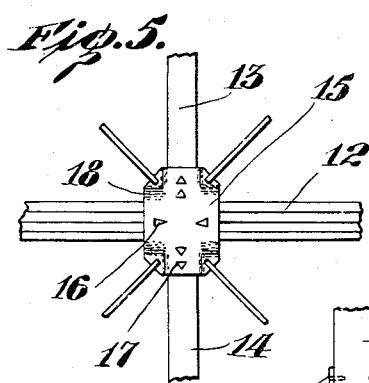
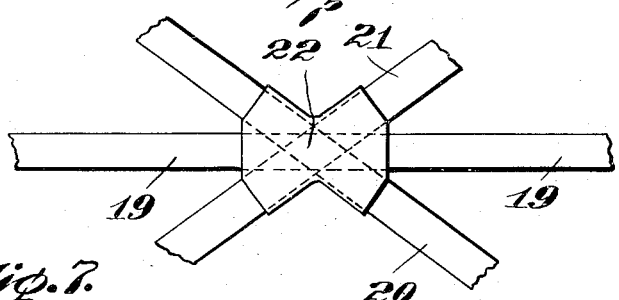
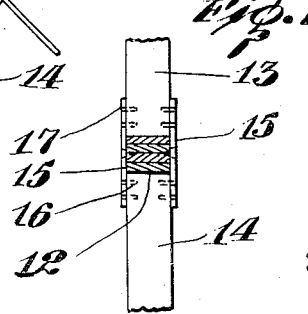
Inventors
Thomas Rutherford Macmechen
and Walter V. Kamp,
By their Attorney

UNITED STATES PATENT OFFICE.

THOMAS R. MACMECHEN AND WALTER V. KAMP, OF NEW YORK, N. Y.

AIRSHIP.

1,219,123.   Specification of Letters Patent.   Patented Mar. 13, 1917.

Application filed June 22, 1916. Serial No. 105,096.

*To all whom it may concern:*

Be it known that we, THOMAS RUTHERFORD MACMECHEN and WALTER V. KAMP, citizens of the United States, and residents of borough and county of Bronx, city and State of New York, have invented certain new and useful Improvements in Airships, of which the following is a specification.

This invention relates to straps of metal intended for the purpose of securely connecting together the members of a wooden structure, as for example the girder members employed in the frame-work of an airship or rigid dirigible, particularly to avoid the weakening of such parts as occurs when holes are produced therein for the reception of bolts and like fastening means, and because, in structures of the stated character, where lightness in weight is so essential a factor, the size of the parts involved must be limited to the minimum, without sacrifice of necessary strength.

Therefore the purpose of the present improvements is in the production of metal straps or castings which will securely bind together contiguous frame members, which may be of laminated material, without weakening them, or adding to their bulk; and a further purpose served by these improvements is to so construct and arrange said metal straps or castings that they will form locating seats for the members they unite, to prevent relative movement of said members at their joints, in the yielding or working of the unified structure. In addition, the metal straps aforesaid, when employed in connecting members of a girder, are especially adapted to serve as terminals for the tension wires with which the girder formation is reinforced.

A still further function of said metal straps is to form an extended bearing or socket for the jointed, and thus weakened laminations in the girder, to thus avoid a too sharp bend occurring at these junctions, in the general yielding of the girder.

In the drawing:—

Figure 1 is an elevation of a composite girder whose elements are connected by our improved fastening members.

Fig. 2 is a perspective enlarged view of a fastening member.

Fig. 3 is a section through the line 3—3 of Fig. 1.

Fig. 4 is a similar view showing the rivet.

Fig. 5 is a front elevation of a modified form of fastening device, for use with a three bar girder.

Fig. 6 is a plan view of a further modified form of fastening, for use in connecting a longitudinal girder with the opposite spiral girders which are associated therewith, and Fig. 7 is an end view of Fig. 5.

An example of the use of our improved metal straps is shown in the drawing, illustrating a girder, which may be composed of longitudinal parallel members, of laminated material, and rectangular in cross section, said members being indicated by the numeral 1, and connecting struts, 2, which may also be of laminated material and rectangular in cross section.

The metal straps each consist of a plate, as of aluminum, or of other metal which is light in weight and possesses suitable strength. Said metal plate is bent right angularly to encompass and fit over three sides of a member 1, thus having the leaves 3 and 4, which lie, respectively, against the opposite sides of said member 1, and also the connecting web 4, which lies against the outer surface of said member 1. The leaves 3, 4, which are wider than the thickness of strut 2, extend inwardly to lie upon a portion of said strut, and said leaves, together with the web 4, which is of equal width therewith, comprise a reinforce socket so as to receive and provide an extended bearing for the member 1 where end joints occur in its laminations. Teeth or sharp projections as 5 are provided on the inner surface of the leaves 3, 4, to become embedded in the material of members 1 and 2 by the application of clamping pressure upon said leaves, to thus firmly engage said members, said teeth being produced as by punching or stamping sections of the plate material inwardly. The leaves 3, 4, are further adapted to obtain secure lodgment upon the members 1 and 2 by pressing or forming the extended portions of said leaves as at 6, to fit over the contained edge portions of said members 1 and 2, thereby providing retaining seats 7 therefor.

The tension wires 8 employed in the construction of a composite girder such as is here represented, may extend from the corners of the leaves 3, 4, and said corners may be folded over, as at 9, to double the thickness of the material, there being provided with reception holes 10 for said tension wires.

The leaves 3, 4, of our improved strap may be securely bound together and clamped upon the members 1 and 2 which they confine and secure together, by means of a bolt or rivet 11, passed through the extended portions of said leaves and the strut 2.

The modified form of fastening device shown in Figs. 5 and 7 is intended for use with a double girder formation, wherein three parallel bars having endwise opposed connecting struts are employed, for the purpose of uniting the inner ends of opposing struts with the central longitudinal bar of such girder. In these views only a portion of the middle bar 12 of such a girder is shown, and portions of opposing struts 13 and 14 appear as abutting respectively against the upper and lower surfaces of said girder. The metal connecting member consists of the plates 15, placed one at each side of the assembled girder bar and struts, and each plate having the inwardly directed teeth 16, with uniting bolts or rivets 17. The corner portions of said plates 15 may be pressed in to form retaining seats 18 for the assembled girder bar and struts, and said corner portions may also have a fold or thickened portion, with an orifice for the tension wires.

In the further modification of Fig. 6, a girder bar 19 is shown, with the crossed, opposite bars 20, 21, of right and left hand spiral girders, said members being connected by a fastening member 22, which is shaped to fit over and conform to the said girder members in their assembled arrangement.

We claim:—

1. The combination with a girder including longitudinal members and transverse connecting members, of a metal strap having parallel leaves extending over opposite surfaces of said members, to unite them, said leaves being shaped to provide fitting and retaining seats for said members, whereby the base of a seat, and the exterior contiguous material of the leaf in which said seat is formed, lie in different parallel planes, and means to connect said leaves in clamped relation.

2. The combination with a girder including longitudinal members and transverse connecting members, of a metal strap having parallel leaves extending over opposite surfaces of said members, to unite them, the corners of said leaves being reinforced and provided with holes to receive tension wires, and uniting means for said leaves.

3. The combination with a girder including longitudinal members and transverse connecting members, of a metal strap having parallel leaves extending over opposite surfaces of said members, to unite them, the corners of said leaves being reinforced and provided with holes to receive tension wires, and a bolt to unite said leaves through said transverse member.

Signed at borough of Manhattan in the city, county and State of New York, this 17th day of June A. D. 1916.

THOS. R. MACMECHEN.
WALTER V. KAMP.

Witnesses:
CHAS. EDGAR,
F. W. BARKER.